(12) United States Patent
Dumange et al.

(10) Patent No.: US 7,419,261 B2
(45) Date of Patent: Sep. 2, 2008

(54) NON-CORRECTIVE LENSES WITH IMPROVED PERIPHERAL VISION

(75) Inventors: Isabelle Dumange, Saint-Claude (FR); Jean Francios Carraze, La Balme de Sillingy (FR); Etienne Billard, Saint-Claude (FR)

(73) Assignee: Sperian Eye & Face Protection, Inc., Smithfield, RI (US)

( * ) Notice: Subject to any disclaimer, the term of this patent is extended or adjusted under 35 U.S.C. 154(b) by 201 days.

(21) Appl. No.: 11/255,736

(22) Filed: Oct. 21, 2005

(65) Prior Publication Data
US 2006/0098161 A1 May 11, 2006

(30) Foreign Application Priority Data
Oct. 22, 2004 (EP) .................... 04360094

(51) Int. Cl.
G02C 7/02 (2006.01)
G02C 5/00 (2006.01)
G02C 7/10 (2006.01)

(52) U.S. Cl. ............................ 351/159; 351/41; 351/44
(58) Field of Classification Search .................. 351/41, 351/44, 159, 177
See application file for complete search history.

(56) References Cited

U.S. PATENT DOCUMENTS

| | | | |
|---|---|---|---|
| 1,741,536 A | 12/1929 | Rayton | |
| 3,526,449 A | 9/1970 | Bolle et al. | |
| 4,741,611 A | 5/1988 | Burns | |
| 4,867,550 A | 9/1989 | Jannard | |
| 4,978,182 A | 12/1990 | Tedesco | |
| 5,604,547 A | 2/1997 | Davis et al. | 351/44 |
| 5,648,832 A * | 7/1997 | Houston et al. | 351/159 |
| 5,774,201 A | 6/1998 | Tackles | |
| 6,009,564 A | 1/2000 | Tackles et al. | |
| 6,019,469 A | 2/2000 | Fecteau et al. | |
| 6,129,435 A | 10/2000 | Reichow et al. | 351/41 |
| 6,142,624 A * | 11/2000 | Morris et al. | 351/159 |
| 6,168,271 B1 | 1/2001 | Houston et al. | |
| 6,254,236 B1 | 7/2001 | Fecteau et al. | |
| 6,334,681 B1 | 1/2002 | Perrott et al. | 351/159 |
| 6,343,860 B1 | 2/2002 | Pierotti | |
| 6,361,166 B1 | 3/2002 | Perrott et al. | 351/159 |
| 6,505,930 B1 | 1/2003 | Perrott et al. | 351/41 |
| 6,682,193 B1 | 1/2004 | Morris et al. | 351/163 |
| 6,715,150 B1 | 4/2004 | Potin | 2/15 |
| 6,811,260 B2 * | 11/2004 | Yamakaji | 351/177 |

(Continued)

FOREIGN PATENT DOCUMENTS

WO WO 97/21136 6/1977

(Continued)

Primary Examiner—Scott J Sugarman
(74) Attorney, Agent, or Firm—Barlow, Josephes & Holmes, Ltd.

(57) ABSTRACT

A method for modifying the shape of a spheric or toric non-corrective lens blank such that astigmatic and peripheral defects are reduced. The outer convex and inner concave sides of the lens are initially designed according to the Gullstrand Formula. Thereafter, a visual axis of the lens is defined relative to a reference axis of the lens blank. In the preferred toric lens, the visual axis of the lens is offset from the reference axis. Once the visual axis is defined, the inner concave surface of the lens is modified so as to improve optical quality in a visual center surrounding the visual axis.

24 Claims, 11 Drawing Sheets

U.S. PATENT DOCUMENTS

2003/0169397 A1    9/2003    Reichow et al. ............... 351/41

FOREIGN PATENT DOCUMENTS

| WO | WO 97/35224    | 9/1977  |
| WO | WO 9721137     | 6/1997  |
| WO | WO 0023021     | 4/2000  |
| WO | WO 02/088830 A1 | 11/2002 |

* cited by examiner

LENSE BLANKS IN THE
"AS WORN POSITION"

LENSES EDGED FROM
BLANKS GIVING A 100mm
"TEMPLE SPAN"

LENSES EDGED FROM
BLANKS GIVING A 110mm
"TEMPLE SPAN"

LENSES EDGED FROM
BLANKS GIVING A 130mm
"TEMPLE SPAN"

NON-CORRECTIVE LENSES WITH IMPROVED PERIPHERAL VISION

BACKGROUND AND SUMMARY OF THE INVENTION

The instant invention relates to non-corrective (non-prescription) lenses for use as sun lenses or safety lenses.

It is well known in the art that piano (non-corrective) sun lenses and safety lenses have convex and concave optical surfaces that are designed according the Gullstrand formula (See FIGS. 1A and 1B). For a spherical shape lens, the Gullstrand formula allows the designer to calculate the value of the concave side radius knowing the convex side radius, the thickness of the lens and the refractive index of the material. When using the Gullstrand formula for lens design, it is understood that the concave radius and convex radius are constant throughout the arc of the lens, but that the centers of the spheres or circles are slightly offset from one another, the offset being equal to the inner radius plus the thickness of the lens less the external Radius. The offset provides the lens with a shape wherein the lens is slightly thicker at the optical center, tapering to thinner at the outer edges. This thinning shape is obvious from the lenses illustrated in FIGS. 1A and 1B.

Such a lens, designed according to the Gullstrand formula gives good results and comfortable vision when the wearer of the eyewear is looking through the optical axis of the lens or in a direction parallel to the optical axis, i.e. generally forward vision looking straight ahead (See FIG. 1A). The optical axis is defined by the line passing through the centers of the two spheres defining both sides of the lenses. However, when the wearer is looking through the periphery of the lens, i.e. either laterally, or upwardly or downwardly, vision suffers from astigmatism, prism or other distortions of the vision.

The Gullstrand formula applies not only to spherical lenses but also to toric lenses (2 curvature radiuses according 2 perpendicular meridians for each side of the lens).

Cylindrical lenses are also considered as particular toric lenses having the vertical meridian with a radius R=∞. The optical aberrations discussed hereinabove are also visible on these lenses as well.

It is also known in the art that the visual axis may be offset from the optical axis as shown in the U.S. Pat. No. to Rayton No. 1,741,536. Such a lens as shown in Rayton generally improves vision in the main visual axis and particularly improves prism deviation. See also FIG. 1B of the drawings which illustrates an offset visual axis in a conventional Gullstrand lens.

In recent years, other developments have also been made in order to improve peripheral vision in both non-corrective and corrective lenses. For example, U.S. Pat. No. 6,129,435 (to Nike) describes a decentred low minus power lens that is intended to improve peripheral vision. This lens offsets the visual axis from the optical axis as previously known and further provides a low minus power to improve optical quality in the center portions of the lens. U.S. Pat. No. 6,361,166 (to Sola) describes an ophthalmic (corrective) lens with different optical zones that improve peripheral vision and avoid prismatic jump when scanning from one optical zone to another optical zone. U.S. Pat. No. 5,604,547 (to Gentex) describes a one-piece wide-field lens having aspheric and atoric (non-circular) inner and outer surfaces (in the horizontal meridian) that allow for good peripheral vision.

It is thus an object of the present invention to improve peripheral vision and astigmatism generally in the case of spherical and torical lenses which are both used in safety and sunglass lenses. The invention may be applied to spherical, cylindrical or torical shields or any shape that would cover one or both eyes. The invention will describe lens blanks whose designs do not show any optical axis whereas in the prior art, the lenses continue to utilize the optical axis.

The present invention aims to improve peripheral vision in the case of spherical lenses, cylindrical and toric lenses, and as an extension of the invention may be applied to any shape (free form). More specifically, the preferred embodiment of the instant invention provides a unique method for modifying the shape of a non-corrective lens such that astigmatic power is reduced throughout the lens and peripheral vision is improved. When the inventive method is applied, for example, to a torical shape, the method will not modify the general torical shape of the lens, but rather only one or both of the surfaces in such a way that the general Gullstrand shape is not changed.

The inventive method may generally be described as follows:

(I) The convex and concave sides of the lens are initially designed according to the Gullstrand Formula.

(II) Thereafter, a visual center of the lens is defined. The location of the visual center is preferably offset from the optical center of the lens. However, an offset location is not necessarily required according to the invention. Generally speaking, the offset of the visual center is determined by the need of the frame customer. Parameters such as base curve, front face angle of the frame, the size of the glazed lens, the distance between left and right lens frame, and the temple span allow the frame manufacturer cut the lens to locate the visual center in proper position in the frame. Accordingly, the visual center of the lens can be specifically designed for glazing in a particular frame.

In the case of the preferred toric lens blank (approximately Base 10/4.5) as will be described in detail herein, the visual center of the lens is preferably shifted along the X axis (horizontal meridian) between about 10 mm to about 25 mm, and preferably about 17 mm. This defines a visual axis (VA) that is parallel to the optical axis (OA) but offset to one side thereof. An additional vertical offset is also possible within the scope of the invention.

(III) Once the visual center is defined, the inner Gullstrand surface (concave surface) of the lens is modified so as to improve optical quality in the area where the visual center of the lens is defined as well as in other areas of the lens around the visual center. Modification of the inner Gullstrand surface is accomplished by first defining the inner surface as a set of reference points (along z-axis) relative to a reference plane (x-y), and then selectively adjusting the position of those reference points (along the z-axis) relative to the reference plane. In other words, the positions of the reference points (or localized groups of reference points) are shifted (along the z-axis) either towards or away from the x-y reference plane, with the effect of thickening or thinning the lens at those points and thus modifying the optical properties of the lens in those selected areas. By changing the values of these reference points, the inner surface is modified in order to improve optical quality, and particularly astigmatism in the main vision axis, but also in the peripheral area.

Improvement in optical quality is initially predicted and tested using three-dimensional modeling software that simulates the impact of light beams through the lens on the retina. The results of this software modeling identifies areas of the lens which have optical aberrations, and allows the lens surfaces to be modified until the aberrations are minimized or eliminated.

It is important to note that the process of defining the inner surface as a set of reference points (rather than radial values) allows the modified inner surface to be described as NURBS surface within a 3-D CAD (computer aided drafting) system. The localized modifications of the inner lens surface as required to improve optical quality, destroy the normally constant radial dimensions of the inner lens surface, and prevent the modified surface from being described by conventional radial dimensions. In the context of making the lenses in a molding process, this would normally prevent the lens surface from being accurately defined in a 3-D CAD system and would prevent automated milling of a mold surface in a computer aided milling (CAD-CAM) machine. However, by defining the inner surface using a NURBS reference system, the surface can now be accurately described and defined within a 3-D CAD system, and that information transferred to a computer aided milling (CAM) machine to produce the corresponding mold surface.

As a result, the lens or shield according to the invention has no optical center as it is defined by at least one surface that has no radius on any meridian. Instead of being defined by the position of the optical center, the lens according to the invention will be defined by the position of the visual center and the orientation the lens will have on the face of the wearer. The original optical axis (prior to modification) is changed to a Reference Axis (RA) and will be provided to the frame manufacturers in order to help frame manufacturers give the lens the proper orientation for glazing.

In other embodiments of the invention, it is possible to modify both the concave and convex surfaces so as to further improve optical properties while still-maintaining the general spherical, toric or cylindrical shape of the lens.

Accordingly, among the objects of the instant invention are:

the provision of a non-corrective lens having improved peripheral vision, and the provision of a method of defining a non-corrective lens having improved peripheral vision.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1A:
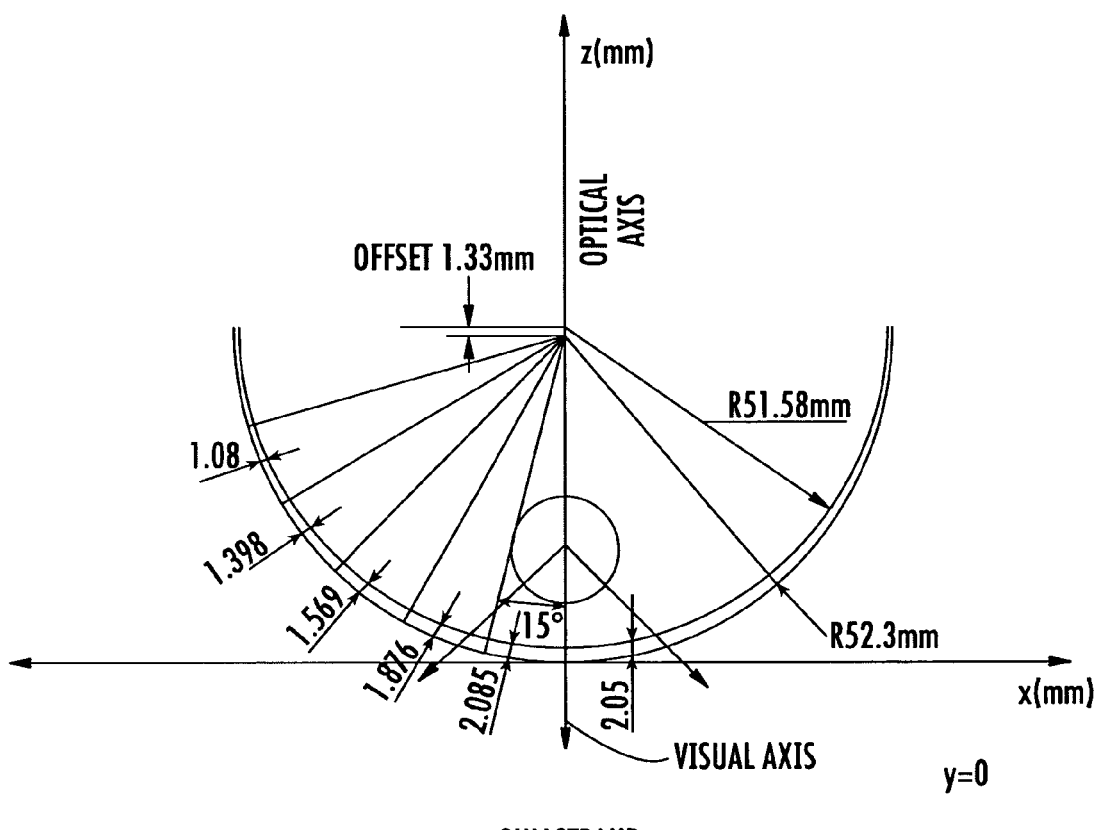
FIG. 1A (prior art) is a cross-sectional view of a toric non-corrective lens designed according to the Gullstrand formula and where, in the as worn position, the visual axis and the optical axis are superimposed, FIG. 1B (prior art) is a cross-sectional view of a toric non-corrective lens designed according to the Gullstrand formula and where, in the as worn position, the visual axis and the optical axis are offset from each other.

Referring now to the drawings, the lens of the instant invention is illustrated and generally indicated at 10 in FIGS. 2-6. As will hereinafter be more fully described, the instant invention aims to improve peripheral vision in the case of spherical lenses, cylindrical and toric lenses, and as an extension of the invention may be applied to any shape (free form).

Figure 9:
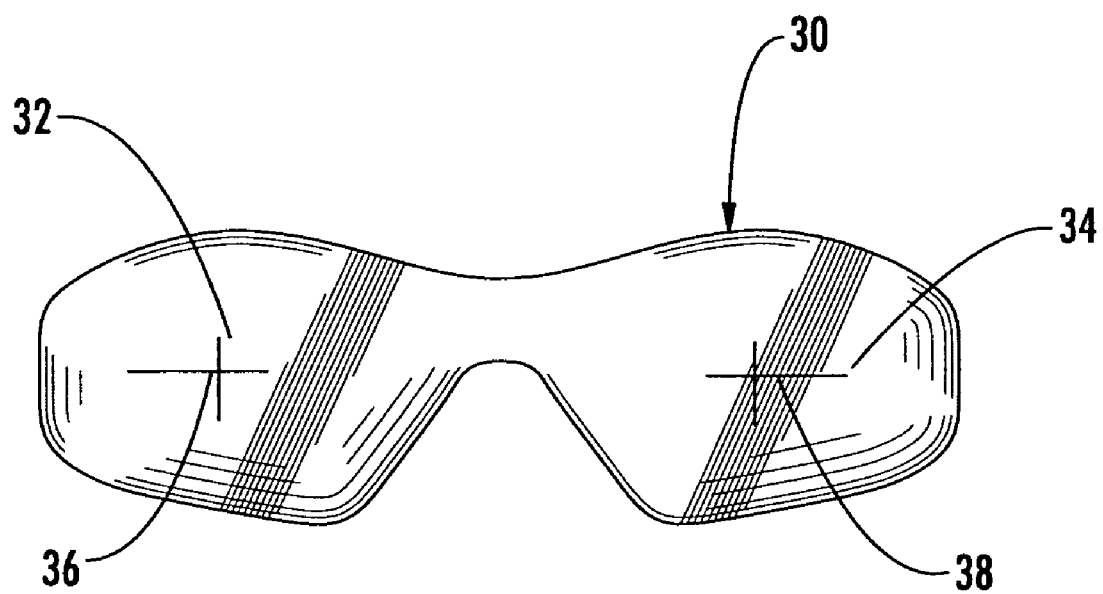
FIG. 9 is a front view of a shield type lens with two lens areas formed from a single shield.
Figure 10:
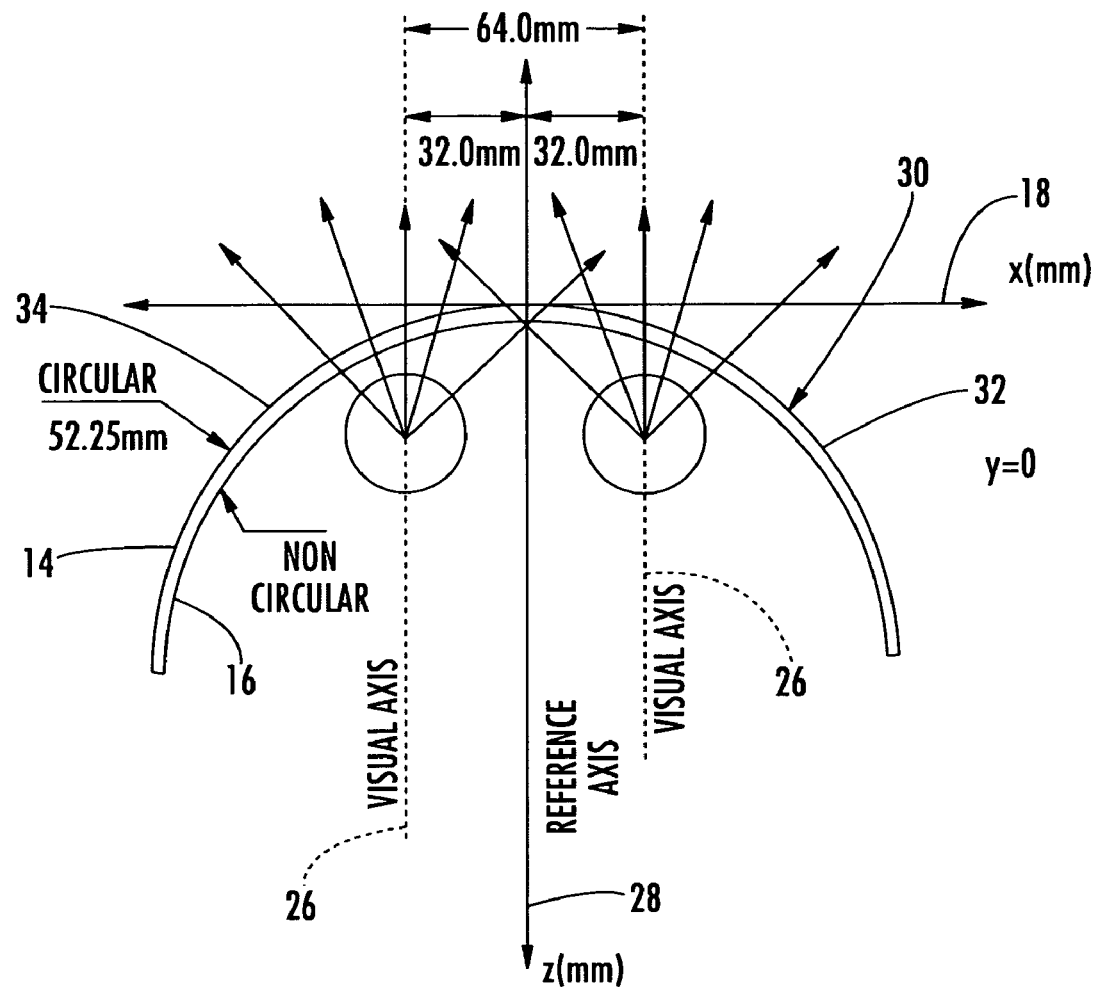
FIG. 10 is a cross-sectional view thereof showing arrangement of the visual axes relative to the reference axis in the center in the case of the invention as applied to a shield.

The lenses described herein are intended to be non-corrective lenses, and thus have no optical power (0 Diopter). The lenses described herein are further intended for primary use as sun lenses and/or safety lenses in dual lens eyewear. However, use is also contemplated in single lens shield-type eyewear as illustrated in FIGS. 9 and 10.

Referring to FIGS. 2-6, the lens 10 is initially formed as a rectangular blank, and then a lens element 12 (shown in broken line) is trimmed from the blank by the glass maker. The lens 10 has an outer convex surface 14, and an inner concave surface 16. The lens 10 as described in the preferred embodiment herein is designed as a toric lens initially having an external horizontal radius R1 measured along a horizontal meridian 18 and an external vertical radius R2 measured along a vertical meridian 20 wherein R2 is greater than R1.

Turning back to the method for obtaining the proper curvature and shape of the lens surfaces 14, 16, the preferred embodiment of the instant invention provides a unique method for modifying the shape of a non-corrective lens such that astigmatic and peripheral distortions are reduced throughout the lens. When the inventive method is applied to a torical shape (or to other shapes), the method will not modify the general shape of the lens 10 but only one or both of the lens surfaces 14, 16, in such a way that the general shape is not changed. Generally speaking, the modifications of the lens surfaces 14, 16 herein are quite small, most ranging from 0.01 mm to slightly more than 0.6 mm. However, the optical effects of these small modifications are quite remarkable.

Figure 1B:
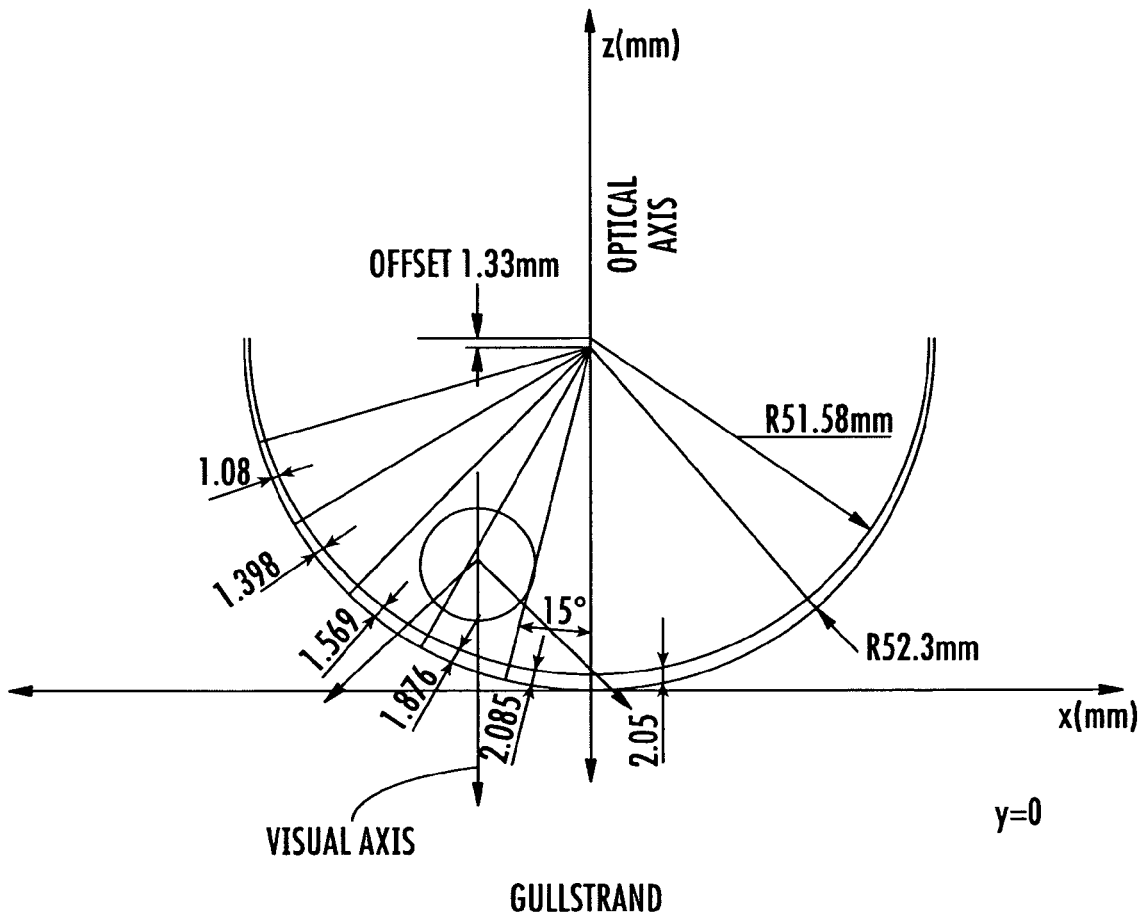
Figure 2:
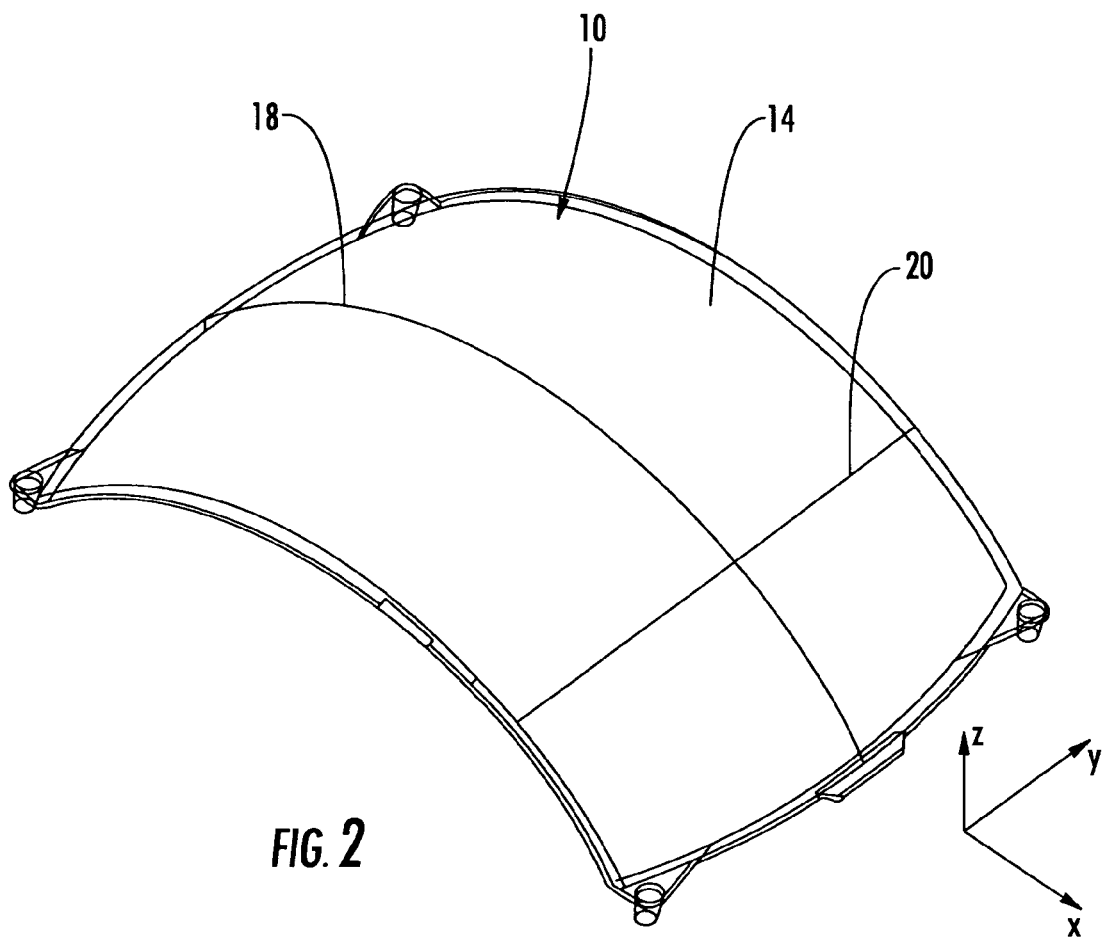
FIG. 2 is a perspective view of a toric non-corrective lens blank designed according to the method of the present invention.
Figure 3:
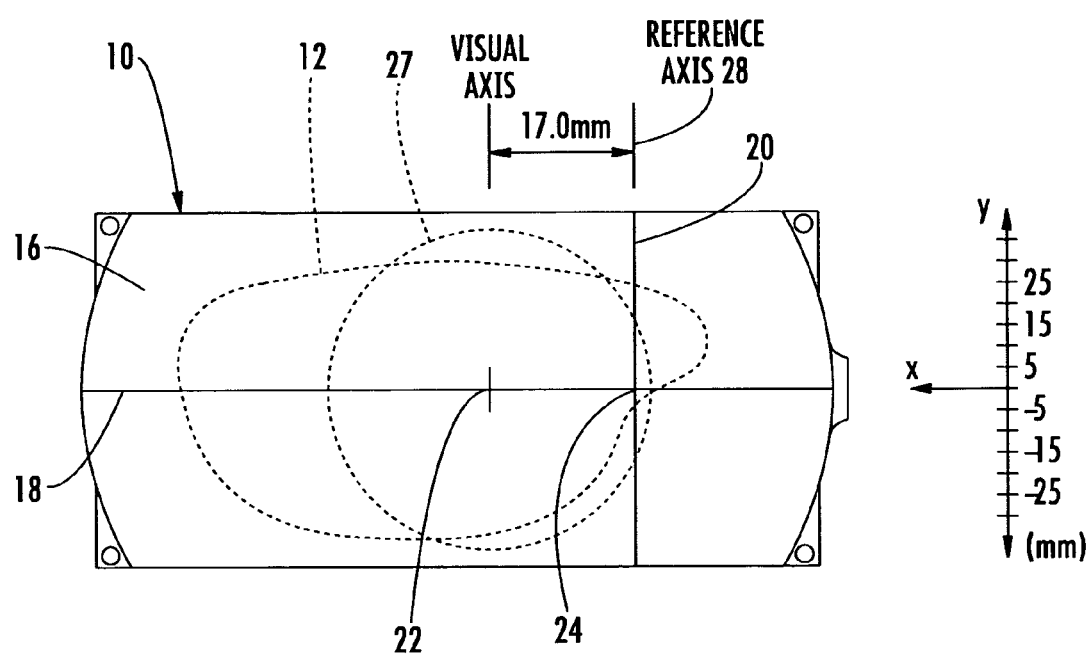
FIG. 3 is a rear view thereof, showing the inner concave surface of the inventive lens blank.
Figure 4:
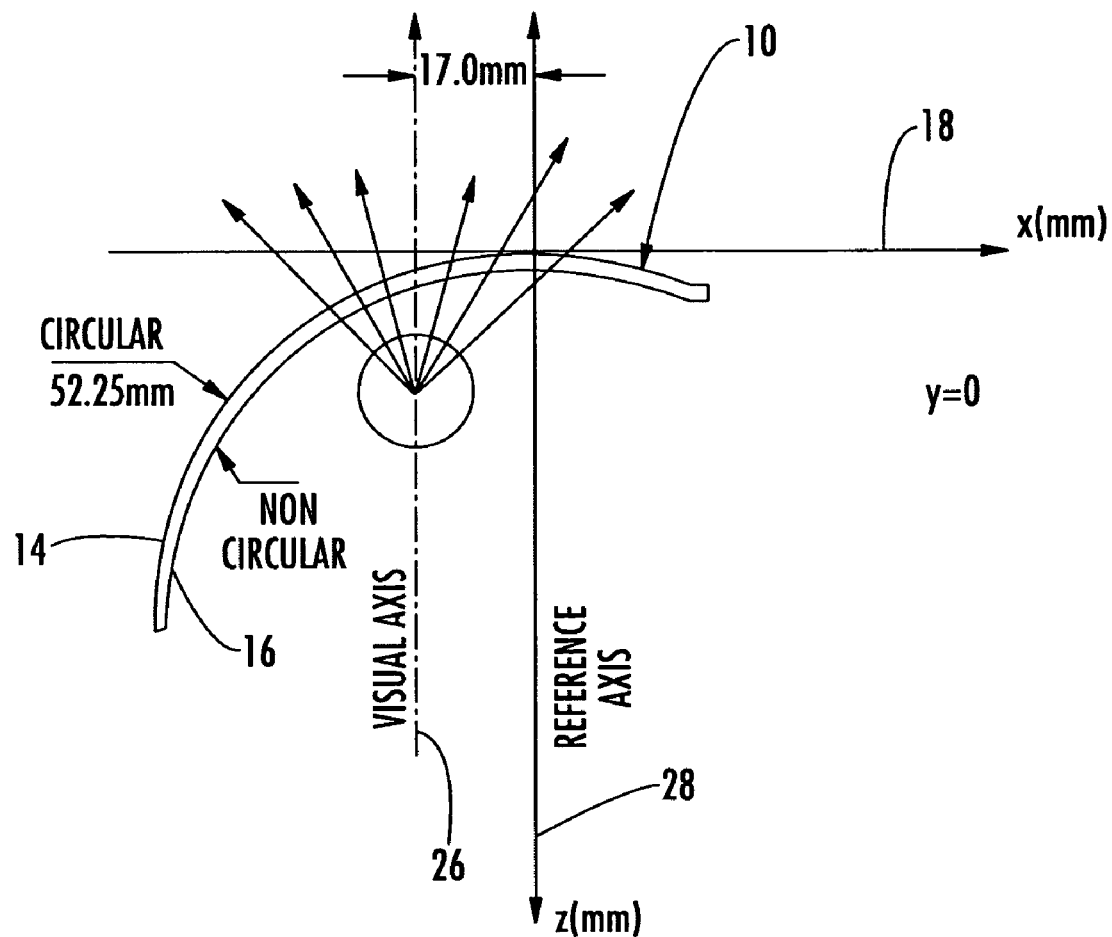
FIG. 4 is a cross-sectional view thereof showing the offset visual axis parallel to the reference axis.

As stated above, the aim of the invention is to correct the residual optical aberrations on a plano (non-corrective) lens. Referring to FIG. 1 and Tables 1 and 2 (below), a lens designed according to the Gullstrand formula includes optical aberrations that create distorted peripheral vision. To highlight the possible optical aberrations of the lens, the impact of the light's beam through the lens on the retina has been simulated through a 3-D ray tracing software program. More specifically, the 3-D ray tracing software simulates the impact of light beams through the lens on the retina. The results of this software modeling identifies areas of the lens which have optical aberrations, and allows the lens surfaces to be modified until the aberrations are minimized or eliminated.

For example, the simulation was made for rays coming from several different directions including:

the visual axis (xy=0), and angular positions on the x-axis from 0-50 and on the y-axis from 0-30 and combinations thereof.

XYZ being considered as:

Z being the visual axis of the lens, and

X and Y being the perpendicular axis respectively oriented toward the lateral periphery and the top periphery of the lens.

For example, with respect to the toric Gullstrand lens of FIG. 1A (Base 10/4.5), two sets of simulated values of optical distortion are presented in Tables 1 and 2 below. The comparative improvements made to the lens by the present invention are shown in the same tables directly below the Gullstrand values.

TABLE 1

(Computer Simulated Optical Power Distortion)
(Visual Axis at X, Y = 0)

| degrees | −50 | −40 | −30 | −20 | −10 | 0 | 10 | 20 | 30 | 40 | 50 |
|---|---|---|---|---|---|---|---|---|---|---|---|
| GULLSTRAND LENS (FIG. 1A) Power distortions ||||||||||||
| 30 | 3 | 3 | 2 | 2 | 1 | 2 | 1 | 3 | 1 | 2 | 2 |
| 20 | 4 | 4 | 3 | 3 | 1 | 1 | 3 | 1 | 1 | 2 | 3 |
| 10 | 7 | 6 | 5 | 4 | 2 | 4 | 9 | 5 | 3 | 4 | 5 |
| 0 | 8 | 7 | 6 | 5 | 3 | 1 | 6 | 4 | 5 | 5 | 5 |
| −10 | 7 | 6 | 5 | 4 | 2 | 4 | 9 | 5 | 3 | 4 | 5 |
| −20 | 4 | 4 | 3 | 3 | 1 | 1 | 3 | 1 | 1 | 2 | 3 |
| −30 | 3 | 3 | 2 | 2 | 1 | 2 | 1 | 3 | 1 | 2 | 2 |
| MODIFIED LENS (INVENTION) Power distortions ||||||||||||
| 30 | 2 | 1 | 1 | 1 | 1 | 2 | 2 | 2 | 2 | 2 | 1 |
| 20 | 1 | 2 | 2 | 2 | 2 | 2 | 2 | 3 | 4 | 3 | 1 |
| 10 | 2 | 3 | 3 | 2 | 1 | 1 | 1 | 2 | 4 | 4 | 2 |
| 0 | 3 | 3 | 2 | 2 | 1 | 1 | 1 | 2 | 3 | 4 | 3 |
| −10 | 2 | 3 | 3 | 2 | 1 | 1 | 1 | 2 | 4 | 4 | 2 |
| −20 | 1 | 2 | 2 | 2 | 2 | 2 | 2 | 3 | 4 | 3 | 1 |
| −30 | 2 | 1 | 1 | 1 | 1 | 2 | 2 | 2 | 2 | 2 | 1 |

The selected visual axis is represented in the Tables at the position of XY=0. To interpret the values above, smaller numerical values represent less distortion. Table 1 represents a value of power distortion. Numbers closer to 1 are preferred. Table 2 represents a value of "definition" of the lens, i.e. the ability to differentiate spaced lines at various angles through the lens. The values represented in the table are not true representations of "definition" according to conventional standards, rather the simulation software can graphically present a chart that illustrates the relative size of areas of distorted vision on the retina, and these areas can give an approximation of "definition". In arriving at the values for the table, these areas of distortion from the simulation chart are bounded by boxes that have a measurable length and a height, measured in microns. The value presented in each cell is a value of area derived from multiplication of the length and height of the distorted areas presented by the software. It is noted that the smallest value for retinal recognition is about 5 microns, and therefore the smallest values in Table 2 are 25.

It is thus fairly simple to identify within the Tables that the distortion is generally less closer to the optical axis of the lens. However, as the impact of the rays is progressively simulated through the outer "peripheral" portions of the lens, the numerical distortion values get larger (distorted peripheral vision). The present invention aims at decreasing numerical values of distortion at all spots on the lens surface.

The inventive method may be described as a series of steps beginning with the design of the outer convex surface 14 of the lens 10.

Step 1 (GULLSTRAND)

In the following description, the considered lens is a toric lens having a horizontal meridian ("X" axis) of 115.6 mm, and a vertical meridian ("Y" axis) of 52.25 mm. The line of sight being along a "Z" axis, perpendicular to X and Y axes.

The outer convex side 14 is designed according the shape of the frame to be equipped. From the value of the convex (external) radiuses, the inner concave surface 16 of the lens is designed according to the Gullstrand Formula applied to both and successively horizontal and vertical meridians.

The GULLSTRAND formula:

$$(D=(n-1)/R1+(n-1)/R2-Th/n*(n-1)/R1*(n-1)/R2)$$

TABLE 2

(Computer Simulated "Definition")
(Visual Axis at X, Y = 0)

| Definition degrees | −50 | −40 | −30 | −20 | −10 | 0 | 10 | 20 | 30 | 40 | 50 |
|---|---|---|---|---|---|---|---|---|---|---|---|
| GULLSTRAND LENS (FIG. 1A) ||||||||||||
| 30 | 26068 | 9794 | 2587 | 659 | 124 | 27 | 25 | 25 | 74 | 378 | 1500 |
| 20 | 16637 | 5731 | 1448 | 339 | 46 | 25 | 25 | 25 | 26 | 207 | 886 |
| 10 | 13455 | 3862 | 991 | 195 | 25 | 25 | 25 | 25 | 25 | 120 | 681 |
| 0 | 10317 | 3209 | 782 | 143 | 25 | 25 | 25 | 25 | 25 | 87 | 568 |
| −10 | 13455 | 3862 | 991 | 195 | 25 | 25 | 25 | 25 | 25 | 120 | 681 |
| −20 | 16637 | 5731 | 1448 | 339 | 46 | 25 | 25 | 25 | 26 | 207 | 886 |
| −30 | 26068 | 9794 | 2587 | 659 | 124 | 27 | 25 | 25 | 74 | 378 | 1500 |
| MODIFIED LENS (INVENTION) ||||||||||||
| 30 | 760 | 700 | 337 | 121 | 48 | 36 | 25 | 25 | 53 | 66 | 105 |
| 20 | 360 | 289 | 139 | 48 | 25 | 25 | 25 | 25 | 25 | 25 | 58 |
| 10 | 184 | 120 | 77 | 35 | 25 | 25 | 25 | 25 | 30 | 25 | 33 |
| 0 | 102 | 100 | 75 | 44 | 25 | 25 | 25 | 25 | 32 | 25 | 30 |
| −10 | 184 | 120 | 77 | 35 | 25 | 25 | 25 | 25 | 30 | 25 | 33 |
| −20 | 360 | 289 | 139 | 48 | 25 | 25 | 25 | 25 | 25 | 25 | 58 |
| −30 | 760 | 700 | 337 | 121 | 48 | 36 | 25 | 25 | 53 | 66 | 105 | defines the power of a lens (D) according 4 parameters:
the radius R1 and R2 of each side of the lens 10, and
the thickness at the optical axis (th), and
the refractive index of the material (n).

It may be used to determine any of the 5 variable parameters (R1, R2, th, n, D) assuming 4 of them are known.

In case of a piano lens (D=0 diopter), such a power (0 D) value is input in the formula and so are one radius, the thickness and the refractive index. As a result you get the second radius. In the case of a toric lens, this is applied for both the horizontal and vertical meridian.

The result is a toric inner surface 14 having an inner horizontal radius measured along a horizontal meridian 12 and an inner vertical radius R4 measured along a vertical meridian 14 wherein R4 is greater than R3.

The results of these calculations are fairly routine of one skilled in the art and will not be described further.

Step 2 (Define the Visual Center)

Definition of the location of the visual center in the blank is linked with frame parameters such as the base curve, the front face angle of the frame, the size of the glazed lens, and the distance between left and right lens in the frame and their size. Such parameters are part of the know-how shared between frame designers and lens manufacturers and lead the lens manufacturer to propose blanks from various characteristics including base curve of the blank, size of the blank, location of the optical center in the prior art, location of the visual center and reference axis in the invention.

Figure 7:
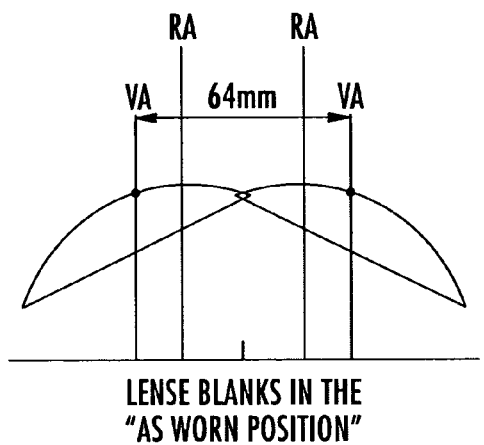
FIG. 7 is a graphical illustration of a pair of the inventive lens blanks mounted in the as worn position.
Figure 8A:
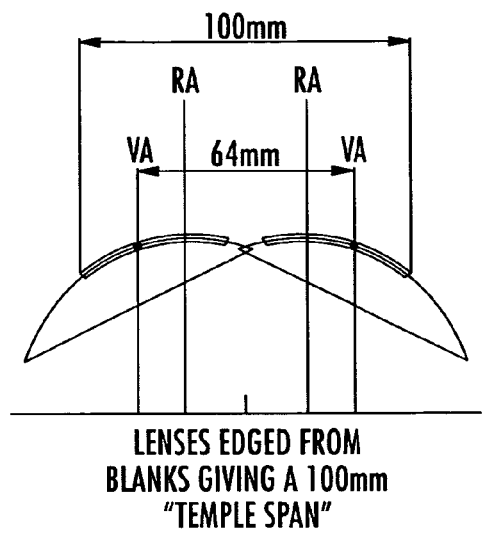
FIGS. 8A-8C are graphical illustrations of respective pairs of lenses edged from the lens blanks for frames having 100 mm temple span, 110 mm temple span, and 130 mm temple span, and showing the locations of the reference axes and visual axes in all cases.
Figure 8B:
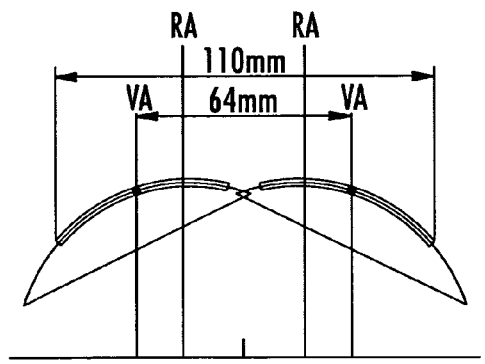
Figure 8C:
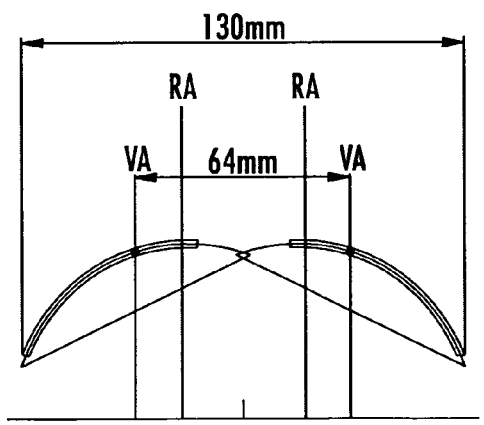

In the prior art, for plano lenses, it is known that the visual center may be offset from the optical center, the value of the decentration also being determined by the need of the frame customer. Parameters such as the base curve, the front face angle of the frame, the size of the glazed lens, the distance between left and right lens in the frame, the temple span of the lens will allow the frame manufacturer to know how to have the cutting tool cutting the lens in order to have the visual axis located in the right area. For example, referring to FIGS. 7 and 8A-8C, lens blanks 10 are initially illustrated in FIG. 7 in the as worn position. Turning to FIGS. 8A-8C, lenses 12 are edged from the blanks 10 at different locations depending on different temple spans.

Accordingly, the position of the lens in the blank is determined by overlapping the visual center position evaluated by the frame manufacturer and the reference parameters of the frame, including temple span.

An important point for purposes of the invention is a realization that the reference system for glazing of the lens has changed. Whereas in the prior art, the primary reference for glazing of the lens was the optical axis, the primary reference for mounting of the lens in the present invention is the visual center of the lens. By providing the lens maker with a visual center, and a reference axis (formerly the optical axis), the lens maker can orient the visual center of the lens within the visual center of the frame in the as worn position.

Turning back to the preferred embodiment as described herein, after the basic values of the toric lens are established, a visual center 22 of the lens 10 is defined at a location on the lens blank 10. In the preferred embodiments of the present invention, the visual center 22 of the lens is offset from the optical center 24 of the lens, however, an offset is not required within the scope of the invention. As described earlier, the concept of offsetting the visual axis from the optical axis of a lens is well known. Referring back to FIGS. 3-6, in the case of the preferred toric lens, the visual center 22 of the lens is offset along the X axis (horizontal meridian) between about 10 mm to about 25 mm, and preferably about 17 mm. This shift defines a visual axis 26 that is parallel to the optical axis 28 but offset to one side thereof. Alternately, the visual axis may be offset from along both the horizontal and vertical meridians.

It is also noted here that the amount of the offset will vary depending on the degree of curvature of the lens. The preferred toric lens as described is generally a Base 10/4.5 curvature and therefore the offset of 10-25 mm will provide the desired effects. However, the offset for a Base 4 or Base 6 lens will be less, i.e. somewhere between 0-10 mm.

Step 3 (Modify the Concave Surface)

Up until and including step 2, the GULLSTRAND formula has been the reference system, establishing the basic values of the concave surface.

From this step forward, the design methods no longer refer to GULLSTRAND anymore; rather the concave surface is turned into a non-circular (aspherical or atoric) shape. Once the visual axis is defined, the inner concave surface 16 of the lens is modified so as to improve optical quality in the area where the visual center of the lens is defined, as well as in other areas of the lens around the visual center.

Figure 5A:
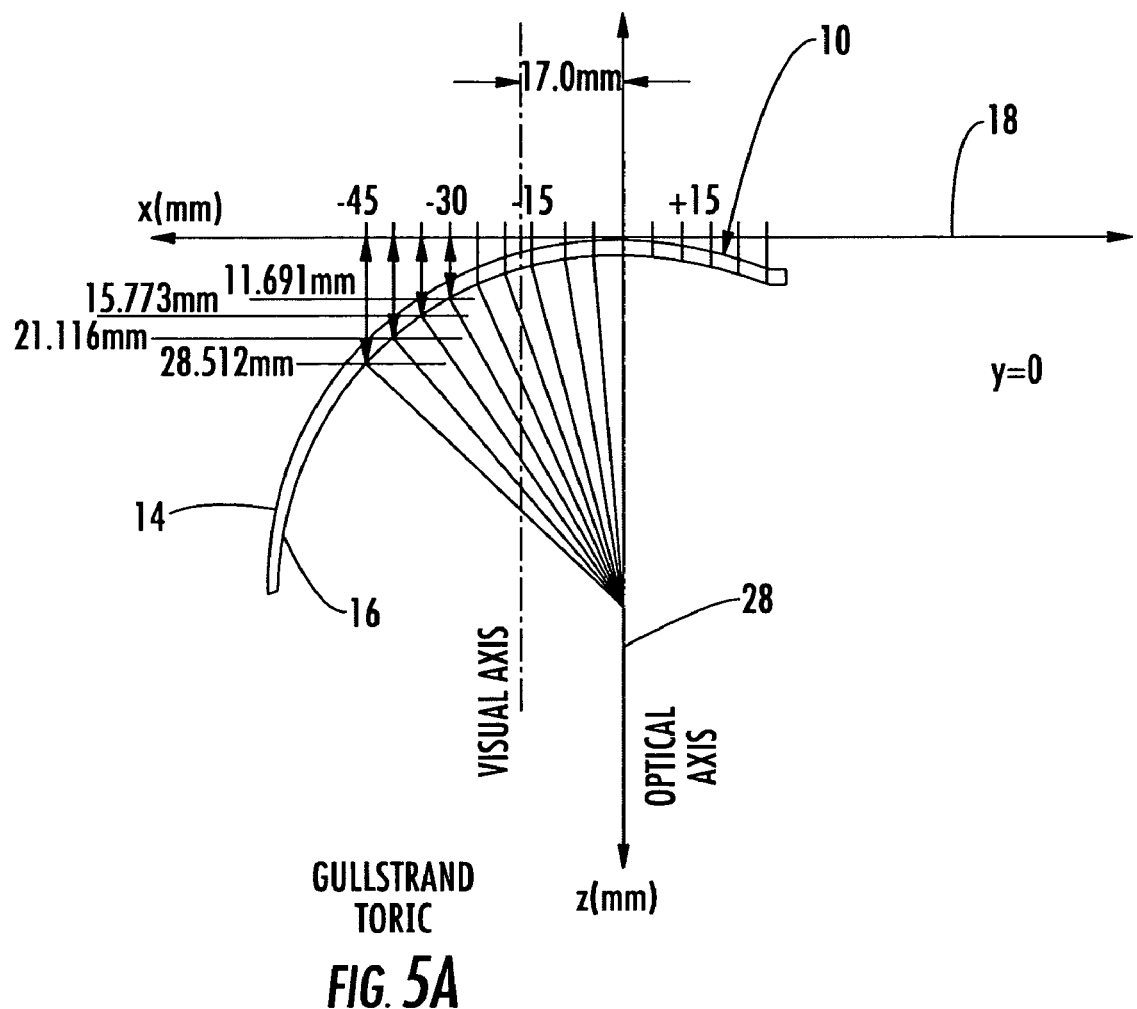
FIG. 5A is a cross-sectional view of an intermediate step in the method showing the original reference dimensions (GULLSTRAND) of the inner concave surface.
Figure 5B:
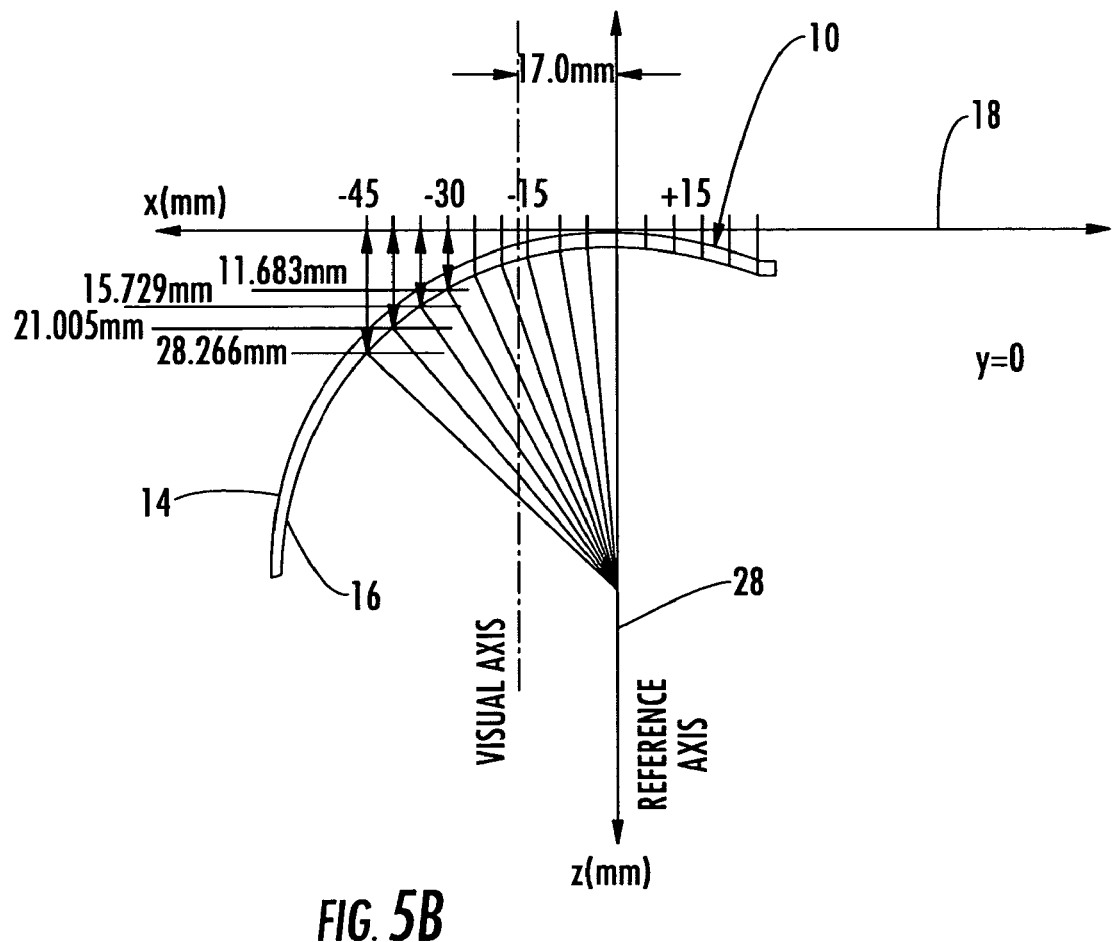
FIG. 5B is another cross-sectional view thereof showing the modified reference dimensions of the inner concave surface along the center (Y=0) axis of the lens blank.
Figure 6:
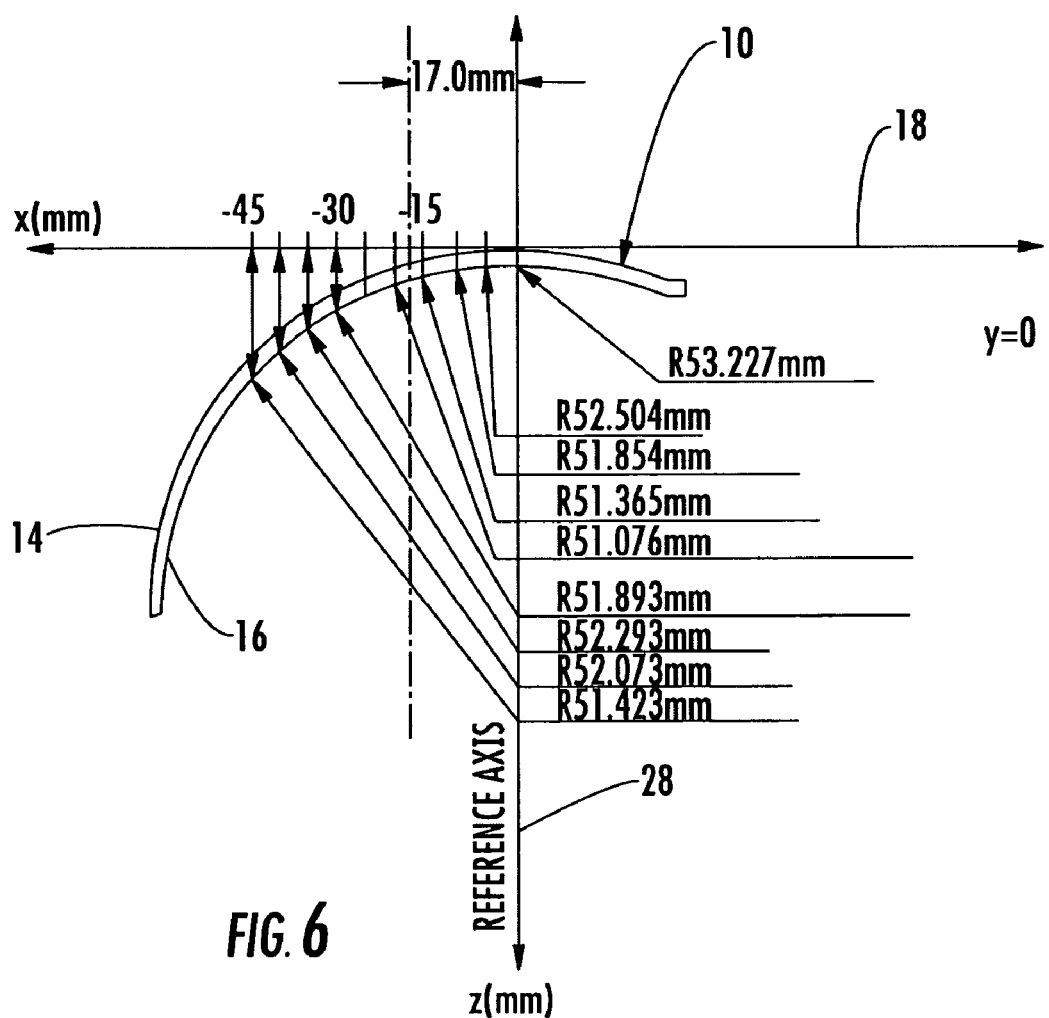
FIG. 6 is yet another cross-sectional view of the inventive lens showing the constantly changing inner radii along the center axis as created by the modified reference points.

Modification of the inner concave lens surface 16 (Gullstrand) is accomplished by first defining the inner concave surface 16 as a set of reference points (along z-axis) relative to a reference plane (x-y) (See FIG. 5A), and then selectively adjusting the position of those reference points (along the z-axis) relative to the reference plane (See FIG. 5B). In other words, the positions of the reference points (or localized groups of reference points) are shifted (along the z-axis) either towards or away from the x-y reference plane, with the effect of thickening or thinning the lens at those points and thus modifying the optical properties of the lens in those selected areas. By changing the values of these reference points, the inner surface is modified in order to improve optical quality, and particularly astigmatism in the main vision axis, but also in the peripheral area.

The resulting inner concave surface 16 is so designed such that it tapers from the central area to the edge and having areas that are slightly thicker and/or slightly thinner, ultimately tapering to thinner towards the outside edge. The shape is still obviously torical and generally retains the basic Gullstrand shape but is distinctly different in optical performance than what a Gullstrand formula would normally provide.

Improvement in optical quality is initially predicted and tested using three-dimensional modeling software that simulates the impact of light beams through the lens on the retina. The results of this software modeling identifies areas of the lens which have optical aberrations, and allows the lens surfaces to be modified until the aberrations are minimized or eliminated. Referring back to Tables 1 and 2 above, the impact of the rays on the modified lens of FIGS. 2-6 is shown just below the corresponding values for the Gullstrand lens in the respective table. Beginning at the visual axis at X,Y=0, and as the impact of the rays is progressively simulated through the outer "peripheral" portions of the modified lens, the larger values as previously discussed hereinabove are now much smaller, identifying a significant reduction in optical distortion, and thus improved vision. It is however understood that some areas closer to the visual axis may in fact have slightly larger values, the optical clarity in those areas being sacrificed in order to provide the significant improvement in the outer peripheral areas. It also has to be understood that the loss of optical clarity reaches numbers that are evaluated by theoretical means but these numbers are far below the minimum sensitivity of the eye so that the eyeglass wearer does not have any perception of the change in clarity in these areas.

Tables 3 and 4 below represent a surface comparison showing the Z-axis values for the inner surface of the lens 10. Illustrations showing orientation of the lens relative to the xyz axes and measurements according to the Tables 3 and 4 are most clearly shown in FIGS. 3-6, wherein:

X represents change of position along the horizontal meridian measured in millimeters, Y represents change of position along the vertical meridian measured in millimeters, Z2 represents the values for the initial GULLSTRAND surface measured in millimeters (See FIG. 5A), and Z1 represents the modified values for optimization of optical characteristics (See FIG. 5B).

TABLE 3

XYZ coordinate values GULLSTRAND AND MODIFIED SURFACES

| X | Y | Z1 (MODIFIED) FIG. 5B | Z2 (GULLSTRAND) FIG. 5A | Z2 − Z1 |
|---|---|---|---|---|
| −45 | 0 | 28.26635 | 28.51244 | 0.246 |
| −40 | 0 | 21.00574 | 21.11571 | 0.110 |
| −35 | 0 | 15.72991 | 15.77358 | 0.044 |
| −30 | 0 | 11.6839 | 11.69173 | 0.008 |
| −25 | 0 | 8.5342 | 8.52601 | −0.008 |
| −20 | 0 | 6.10928 | 6.09272 | −0.017 |
| −15 (approx. visual axis) | 0 | 4.30851 | 4.28319 | −0.025 |
| −10 | 0 | 3.06408 | 3.03034 | −0.034 |
| −5 | 0 | 2.33144 | 2.29333 | −0.038 |
| 0 (reference axis) | 0 | 2.08282 | 2.05 | −0.033 |
| 5 | 0 | 2.3049 | 2.29333 | −0.012 |
| 10 | 0 | 2.99754 | 3.03034 | 0.033 |
| 15 | 0 | 4.17462 | 4.28319 | 0.109 |
| 20 | 0 | 5.87269 | 6.09272 | 0.220 |
| 25 | 0 | 8.16288 | 8.52601 | 0.363 |
| 30 | 0 | 11.16844 | 11.69173 | 0.523 |
| 35 | 0 | 15.11128 | 15.77358 | 0.662 |
| 40 | 0 | 20.42698 | 21.11571 | 0.689 |
| 45 | 0 | 27.94506 | 28.51244 | 0.567 |
| −45 | 5 | 28.48573 | 28.73798 | 0.252 |
| −40 | 5 | 21.17634 | 21.28949 | 0.113 |
| −35 | 5 | 15.87682 | 15.92267 | 0.046 |
| −30 | 5 | 11.81718 | 11.82623 | 0.009 |
| −25 | 5 | 8.65866 | 8.65103 | −0.008 |
| −20 | 5 | 6.22759 | 6.21131 | −0.016 |
| −15 | 5 | 4.42231 | 4.39741 | −0.025 |
| −10 | 5 | 3.17461 | 3.14172 | −0.033 |
| −5 | 5 | 2.43981 | 2.40311 | −0.037 |
| 0 | 5 | 2.19004 | 2.15926 | −0.031 |
| 5 | 5 | 2.41191 | 2.40311 | −0.009 |
| 10 | 5 | 3.10536 | 3.14172 | 0.036 |
| 15 | 5 | 4.28438 | 4.39741 | 0.113 |
| 20 | 5 | 5.98586 | 6.21131 | 0.225 |
| 25 | 5 | 8.28158 | 8.65103 | 0.369 |
| 30 | 5 | 11.29602 | 11.82623 | 0.530 |
| 35 | 5 | 15.25385 | 15.92267 | 0.669 |
| 40 | 5 | 20.59664 | 21.28949 | 0.693 |
| 45 | 5 | 28.16878 | 28.73798 | 0.569 |
| −45 | 10 | 29.15451 | 29.42563 | 0.271 |
| −40 | 10 | 21.69304 | 21.81529 | 0.122 |
| −35 | 10 | 16.32042 | 16.37248 | 0.052 |
| −30 | 10 | 12.21883 | 12.23141 | 0.013 |
| −25 | 10 | 9.03327 | 9.0273 | −0.006 |
| −20 | 10 | 6.58349 | 6.56803 | −0.015 |
| −15 | 10 | 4.76461 | 4.74088 | −0.024 |
| −10 | 10 | 3.50719 | 3.47657 | −0.031 |
| −5 | 10 | 2.7661 | 2.73309 | −0.033 |
| 0 | 10 | 2.51307 | 2.48766 | −0.025 |
| 5 | 10 | 2.7346 | 2.73309 | −0.002 |
| 10 | 10 | 3.43072 | 3.47657 | 0.046 |
| 15 | 10 | 4.61583 | 4.74088 | 0.125 |
| 20 | 10 | 6.32786 | 6.56803 | 0.240 |
| 25 | 10 | 8.64053 | 9.0273 | 0.387 |

TABLE 3-continued

XYZ coordinate values GULLSTRAND AND MODIFIED SURFACES

| X | Y | Z1 (MODIFIED) FIG. 5B | Z2 (GULLSTRAND) FIG. 5A | Z2 − Z1 |
|---|---|---|---|---|
| 30 | 10 | 11.6822 | 12.23141 | 0.549 |
| 35 | 10 | 15.68605 | 16.37248 | 0.686 |
| 40 | 10 | 21.11226 | 21.81529 | 0.703 |
| 45 | 10 | 28.85305 | 29.42563 | 0.573 |
| −45 | 15 | 30.30662 | 30.6117 | 0.305 |
| −40 | 15 | 22.57041 | 22.70724 | 0.137 |
| −35 | 15 | 17.06892 | 17.13086 | 0.062 |
| −30 | 15 | 12.89418 | 12.91242 | 0.018 |
| −25 | 15 | 9.6618 | 9.65856 | −0.003 |
| −20 | 15 | 7.17991 | 7.1658 | −0.014 |
| −15 | 15 | 5.33805 | 5.31599 | −0.022 |
| −10 | 15 | 4.06446 | 4.037 | −0.027 |
| −5 | 15 | 3.3131 | 3.28522 | −0.028 |
| 0 | 15 | 3.05502 | 3.03712 | −0.018 |
| 5 | 15 | 3.27645 | 3.28522 | 0.009 |
| 10 | 15 | 3.97758 | 4.037 | 0.059 |
| 15 | 15 | 5.17347 | 5.31599 | 0.143 |
| 20 | 15 | 6.90384 | 7.1658 | 0.262 |
| 25 | 15 | 9.24587 | 9.65856 | 0.413 |
| 30 | 15 | 12.33476 | 12.91242 | 0.578 |
| 35 | 15 | 16.41899 | 17.13086 | 0.712 |
| 40 | 15 | 21.99181 | 22.70724 | 0.715 |
| 45 | 15 | 30.03772 | 30.6117 | 0.574 |
| −45 | 20 | 32.00946 | 32.37022 | 0.361 |
| −40 | 20 | 23.83478 | 23.99158 | 0.157 |
| −35 | 20 | 18.13674 | 18.2119 | 0.075 |
| −30 | 20 | 13.85243 | 13.87832 | 0.026 |
| −25 | 20 | 10.5508 | 10.55129 | 0.000 |
| −20 | 20 | 8.02193 | 8.00964 | −0.012 |
| −15 | 20 | 6.14709 | 6.1269 | −0.020 |
| −10 | 20 | 4.85061 | 4.82661 | −0.024 |
| −5 | 20 | 4.08507 | 4.06283 | −0.022 |
| 0 | 20 | 3.82038 | 3.81085 | −0.010 |
| 5 | 20 | 4.0424 | 4.06283 | 0.020 |
| 10 | 20 | 4.75145 | 4.82661 | 0.075 |
| 15 | 20 | 5.96353 | 6.1269 | 0.163 |
| 20 | 20 | 7.72106 | 8.00964 | 0.289 |
| 25 | 20 | 10.10648 | 10.55129 | 0.445 |
| 30 | 20 | 13.26551 | 13.87832 | 0.613 |
| 35 | 20 | 17.47071 | 18.2119 | 0.741 |
| 40 | 20 | 23.26623 | 23.99158 | 0.725 |
| 45 | 20 | 31.80067 | 32.37022 | 0.570 |
| −45 | 25 | 34.39097 | 34.84644 | 0.455 |
| −40 | 25 | 25.52921 | 25.71205 | 0.183 |
| −35 | 25 | 19.54642 | 19.63782 | 0.091 |
| −30 | 25 | 15.10766 | 15.14298 | 0.035 |
| −25 | 25 | 11.7101 | 11.71524 | 0.005 |
| −20 | 25 | 9.11711 | 9.10696 | −0.010 |
| −15 | 25 | 7.19814 | 7.17964 | −0.019 |
| −10 | 25 | 5.87158 | 5.85064 | −0.021 |
| −5 | 25 | 5.08784 | 5.07072 | −0.017 |
| 0 | 25 | 4.81527 | 4.81353 | −0.002 |
| 5 | 25 | 5.03902 | 5.07072 | 0.032 |
| 10 | 25 | 5.75961 | 5.85064 | 0.091 |
| 15 | 25 | 6.99428 | 7.17964 | 0.185 |
| 20 | 25 | 8.78926 | 9.10696 | 0.318 |
| 25 | 25 | 11.23455 | 11.71524 | 0.481 |
| 30 | 25 | 14.49127 | 15.14298 | 0.652 |
| 35 | 25 | 18.86851 | 19.63782 | 0.769 |
| 40 | 25 | 24.98508 | 25.71205 | 0.727 |
| 45 | 25 | 34.29069 | 34.84644 | 0.556 |
| −45 | 30 | 37.7202 | 38.36229 | 0.642 |
| −40 | 30 | 27.72347 | 27.94116 | 0.218 |
| −35 | 30 | 21.33214 | 21.44231 | 0.110 |
| −30 | 30 | 16.68036 | 16.72651 | 0.046 |
| −25 | 30 | 13.15371 | 13.16412 | 0.010 |
| −20 | 30 | 10.47592 | 10.46802 | −0.008 |
| −15 | 30 | 8.49986 | 8.48244 | −0.017 |
| −10 | 30 | 7.13519 | 7.11613 | −0.019 |
| −5 | 30 | 6.32905 | 6.31532 | −0.014 |
| 0 | 30 | 6.04751 | 6.05138 | 0.004 |
| 5 | 30 | 6.27475 | 6.31532 | 0.041 |

TABLE 3-continued

XYZ coordinate values GULLSTRAND AND MODIFIED SURFACES

| X | Y | Z1 (MODIFIED) FIG. 5B | Z2 (GULLSTRAND) FIG. 5A | Z2 − Z1 |
|---|---|---|---|---|
| 10 | 30 | 7.01141 | 7.11613 | 0.105 |
| 15 | 30 | 8.27635 | 8.48244 | 0.206 |
| 20 | 30 | 10.12115 | 10.46802 | 0.347 |
| 25 | 30 | 12.64645 | 13.16412 | 0.518 |
| 30 | 30 | 16.03572 | 16.72651 | 0.691 |
| 35 | 30 | 20.65284 | 21.44231 | 0.789 |
| 40 | 30 | 27.22803 | 27.94116 | 0.713 |
| 45 | 30 | 37.83096 | 38.36229 | 0.531 |

TABLE 4

Cartography Z2-Z1
(X horizontal axis/Y vertical axis)

| Y | | | | | | | | | | Y | | | | | | | | | | |
|---|---|---|---|---|---|---|---|---|---|---|---|---|---|---|---|---|---|---|---|---|
| 30 | 0.64 | 0.22 | 0.11 | 0.05 | 0.01 | −0.01 | −0.02 | −0.02 | −0.01 | 30 | 0.00 | 0.04 | 0.10 | 0.21 | 0.35 | 0.52 | 0.69 | 0.79 | 0.71 | 0.53 |
| 25 | 0.46 | 0.18 | 0.09 | 0.04 | 0.01 | −0.01 | −0.02 | −0.02 | −0.02 | 25 | 0.00 | 0.03 | 0.09 | 0.19 | 0.32 | 0.48 | 0.65 | 0.77 | 0.73 | 0.56 |
| 20 | 0.36 | 0.16 | 0.08 | 0.03 | 0.00 | −0.01 | −0.02 | −0.02 | −0.02 | 20 | −0.01 | 0.02 | 0.08 | 0.16 | 0.29 | 0.44 | 0.61 | 0.74 | 0.73 | 0.57 |
| 15 | 0.31 | 0.14 | 0.06 | 0.02 | 0.00 | −0.01 | −0.02 | −0.03 | −0.03 | 15 | −0.02 | 0.01 | 0.06 | 0.14 | 0.26 | 0.41 | 0.58 | 0.71 | 0.72 | 0.57 |
| 10 | 0.27 | 0.12 | 0.05 | 0.01 | −0.01 | −0.02 | −0.02 | −0.03 | −0.03 | 10 | −0.03 | 0.00 | 0.05 | 0.13 | 0.24 | 0.39 | 0.55 | 0.69 | 0.70 | 0.57 |
| 5 | 0.25 | 0.11 | 0.05 | 0.01 | −0.01 | −0.02 | −0.02 | −0.03 | −0.04 | 5 | −0.03 | −0.01 | 0.04 | 0.11 | 0.23 | 0.37 | 0.53 | 0.67 | 0.69 | 0.57 |
| 0 | 0.25 | 0.11 | 0.04 | 0.01 | −0.01 | −0.02 | −0.03 | −0.03 | −0.04 | 0 | −0.03 | −0.01 | 0.03 | 0.11 | 0.22 | 0.36 | 0.52 | 0.66 | 0.69 | 0.57 |
| X | −45 | −40 | −35 | −30 | −25 | −20 | −15 | −10 | −5 | X | 0 | 5 | 10 | 15 | 20 | 25 | 30 | 35 | 40 | 45 |
| −5 | 0.25 | 0.11 | 0.05 | 0.01 | −0.01 | −0.02 | −0.03 | −0.03 | −0.04 | −5 | −0.03 | −0.01 | 0.04 | 0.11 | 0.23 | 0.37 | 0.53 | 0.67 | 0.69 | 0.57 |
| −10 | 0.27 | 0.12 | 0.05 | 0.01 | −0.01 | −0.02 | −0.02 | −0.03 | −0.03 | −10 | −0.03 | 0.00 | 0.05 | 0.13 | 0.24 | 0.39 | 0.55 | 0.69 | 0.70 | 0.57 |
| −15 | 0.31 | 0.14 | 0.6 | 0.02 | 0.00 | −0.01 | −0.02 | −0.03 | −0.03 | −15 | −0.02 | 0.01 | 0.06 | 0.14 | 0.26 | 0.41 | 0.58 | 0.71 | 0.72 | 0.57 |
| −20 | 0.36 | 0.16 | 0.08 | 0.03 | 0.00 | −0.01 | −0.02 | −0.02 | −0.02 | −20 | −0.01 | 0.02 | 0.08 | 0.16 | 0.29 | 0.44 | 0.61 | 0.74 | 0.73 | 0.57 |
| −25 | 0.46 | 0.18 | 0.09 | 0.04 | 0.01 | −0.01 | −0.02 | −0.02 | −0.02 | −25 | 0.00 | 0.03 | 0.09 | 0.19 | 0.32 | 0.48 | 0.65 | 0.77 | 0.73 | 0.56 |
| −30 | 0.64 | 0.22 | 0.11 | 0.05 | 0.01 | −0.01 | −0.02 | −0.02 | −0.01 | −30 | 0.00 | 0.04 | 0.10 | 0.21 | 0.35 | 0.52 | 0.69 | 0.79 | 0.71 | 0.53 |

It is important to note that the process of defining the inner concave surface as a set of reference points (rather than radial values along meridians) allows the modified inner surface to be described as a NURBS surface within a 3-D CAD system. NURBS surfaces are well-known in the drafting arts, and have been in active use since the early 1990's. A NURBS surface is a Non-Uniform Rational B-Spline surface of $n^{th}$ degree, typically $1^{st}$ through $5^{th}$ degree. NURBS curves and NURBS surfaces have to some extent become the de facto industry standard for representing complex geometric information in CAD, CAE and CAM, and are an integral part of many standard data exchange formats such as IGES, STEP and PHIGS. The reference points that were established earlier form the NURBS control points for defining the curved surfaces of the lens. Ideally, these NURBS surfaces should be defined by at least 10 control points. The NURBS surface formulas take all of these control points and form a smooth surface, which attempts to smoothly connect most if not all of the points. Because all points on the surface are related within the NURBS formulas, this is why some areas of the lenses actually have slightly increased distortion from the Gullstrand design. A change in thickness at one control point in the lens affects the surrounding areas. Thus, in order to improve one area, another area may be degraded.

The way in which the lens surface is important in the context of the invention because the localized modifications of the lens surface required to improve optical quality destroy the normally constant radial dimensions of the lens surface, and prevent the modified surface from being described by conventional radial dimensions. In the context of making the lenses in a molding process, this would normally prevent the lens surface from being accurately defined in a 3-D CAD system and would thus prevent automated milling of a mold surface in a computer aided milling machine. However, by defining the inner surface using a NURBS reference system, the modified inner surface can now be accurately described and defined within a 3-D CAD system, and that information transferred to a computer aided milling (CAM) machine to produce the corresponding mold surface.

As a result of the process, the lens blank or shield according to the invention has no optical center, as it is defined by at least one surface which has no continuous radius on any meridian. Generally speaking, the inner surface of the lens is either aspheric or atoric but having only very small changes in thickness and radii along both the horizontal and vertical curvatures. Further, instead of being defined by the position of the optical center, the lens 10 according to the invention will be defined by the position of the visual center and the orientation the lens will have on the face of the wearer. The original optical axis (prior to modification) will be provided in order to help frame manufacturers give the lens the proper orientation for grinding.

Alternate Embodiments

It is also contemplated to modify both the concave and convex surfaces so as to further improve optical properties while still maintaining the general spherical, toric or cylindrical shape of the lens. In this case, both the concave and convex surfaces would be initially defined by sets of reference points and then the relative positions modified to obtain the desired optical characteristic. The resulting surfaces would then be represented by appropriate NURBS surfaces.

Turning now to FIGS. 9 and 10, there is shown a unitary single lens or shield generally indicated at 30 incorporating the inventive concepts of the present invention. In this regard, the lens 30 has left and right lens portions 32, 34 respectively each having a visual center 36, 38 positioned in the line of sight of the left and right eyes of the wearer in the as worn condition. In this regard, each of the lens portions 32, 34 is individually constructed in accordance with the teachings of the present invention wherein, each lens portion has a visual center, a central area, and a peripheral area, and both the convex and concave sides of the lens are designed accordingly.

It can therefore be seen that the present invention provides a non-corrective lens having improved peripheral vision. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

The invention claimed is:

1. A non-corrective optical lens blank adapted for mounting in eyewear after appropriate glazing, said lens blank comprising:
   an outer convex surface, and
   an inner concave surface,
      said outer convex surface having a horizontal curvature and a vertical curvature, each of said horizontal and vertical curvatures being described by a constant dimension, said outer convex surface having a reference axis, a visual axis defined relative to said reference axis, and a visual area surrounding the visual axis, said visual axis defining the location where the visual area of a lens is intended to be located in the as worn position,
      said inner concave surface having a horizontal curvature and a vertical curvature, each of said horizontal and vertical curvatures being described by a varying radial dimension with the effect of thickening and thinning the lens blank at predetermined reference points.

2. The lens blank according to claim 1, wherein said outer convex surface has a circular surface configuration and said inner concave surface has a substantially circular configuration but of varying radial dimension.

3. The lens blank according to claim 2, wherein said outer convex surface has a spherical configuration and said inner concave surface has a substantially spherical configuration, but of varying radial dimension.

4. The lens blank according to claim 3, wherein said inner concave surface is defined as an aspheric NURBS surface of at least 10 control points and degree 2.

5. The lens blank according to claim 3, wherein said inner concave surface is defined as an aspheric NURBS surface of at least 10 control points and degree 3.

6. The blank according to claim 3, wherein said inner concave surface is defined as an aspheric NURBS surface of at least 10 control points and degree 4.

7. The lens blank according to claim 3, wherein said inner concave surface is defined as an aspheric NURBS surface of at least 10 control points and degree 5.

8. The lens blank according to claim 2, wherein said outer convex surface has a toric configuration, and said inner concave surface has a substantially toric configuration but of varying radial dimension.

9. The lens blank according to claim 8, wherein said inner concave surface is defined as an atoric NURBS surface of at least 10 control points and degree 2.

10. The lens blank according to claim 8, wherein said inner concave surface is defined as an atoric NURBS surface of at least 10 control points and degree 3.

11. The lens blank according to claim 8, wherein said inner concave surface is defined as an atoric NURBS surface of at least 10 control points and degree 4.

12. The lens blank according to claim 8, wherein said inner concave surface is defined as an atoric NURBS surface of at least 10 control points and degree 5.

13. A method of manufacturing a non-corrective optical lens blank adapted for mounting in eyewear after appropriate glazing, said method comprising the steps of:
   designing an outer convex surface of the lens blank;
   designing an inner concave surface of the lens blank;
   defining a reference axis relative to the outer convex surface;
   defining a visual axis relative to said reference axis;
   defining a visual area surrounding the visual axis, said visual axis showing the location where the visual area is intended in the as worn position; and
   modifying the inner concave surface by varying the radial dimension of the inner concave surface at predetermined reference points so as to improve optical quality of the lens blank at said predetermined reference points whereby said modified inner concave surface has continuous horizontal and vertical curvatures in both horizontal and vertical meridians, but of varying radial dimension.

14. The method according to claim 13, wherein said outer convex surface has a circular surface configuration and said inner concave surface has a substantially circular configuration but of varying radial dimension.

15. The method according to claim 14, wherein said outer convex surface has a spherical configuration and said inner concave surface has a substantially spherical configuration, but of varying radial dimension.

16. The method according to claim 15, wherein said inner concave surface is defined as an aspheric NURBS surface of at least 10 control points and degree 2.

17. The method according to claim 15, wherein said inner concave surface is defined as an aspheric NURBS surface of at least 10 control points and degree 3.

18. The method according to claim 15, wherein said inner concave surface is defined as an aspheric NURBS surface of at least 10 control points and degree 4.

19. The method according to claim 15, wherein said inner concave surface is defined as an aspheric NURBS surface of at least 10 control points and degree 5.

20. The method according to claim 14, wherein said outer convex surface has a toric configuration, and said inner concave surface has a substantially toric configuration but of varying radial dimension.

21. The method according to claim 20, wherein said inner concave surface is defined as an atoric NURBS surface of at least 10 control points and degree 2.

22. The method according to claim 20, wherein said inner concave surface is defined as an atoric NURBS surface of at least 10 control points and degree 3.

23. The method according to claim 20, wherein said inner concave surface is defined as an atoric NURBS surface of at least 10 control points and degree 4.

24. The method according to claim 20, wherein said inner concave surface is defined as an atoric NURBS surface of at least 10 control points and degree 5.

* * * * *